United States Patent
Zeng et al.

(10) Patent No.: US 11,522,369 B2
(45) Date of Patent: Dec. 6, 2022

(54) BATTERY MANAGEMENT DEVICE AND MOBILE TERMINAL

(71) Applicant: ZTE Corporation, Shenzhen (CN)

(72) Inventors: Xianzheng Zeng, Shenzhen (CN); Aitong Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 47 days.

(21) Appl. No.: 17/040,334

(22) PCT Filed: Apr. 1, 2019

(86) PCT No.: PCT/CN2019/080883
§ 371 (c)(1),
(2) Date: Sep. 22, 2020

(87) PCT Pub. No.: WO2019/201085
PCT Pub. Date: Oct. 24, 2019

(65) Prior Publication Data
US 2021/0021137 A1  Jan. 21, 2021

(30) Foreign Application Priority Data
Apr. 19, 2018 (CN) .......................... 201810356296.9

(51) Int. Cl.
*H02J 7/00* (2006.01)
*H01M 10/42* (2006.01)
*H01M 10/46* (2006.01)

(52) U.S. Cl.
CPC ......... *H02J 7/0013* (2013.01); *H01M 10/425* (2013.01); *H01M 10/46* (2013.01);
(Continued)

(58) Field of Classification Search
CPC .... H02J 7/0013; H02J 7/00032; H02J 7/0029; H01M 10/425; H01M 10/46;
(Continued)

(56) References Cited

U.S. PATENT DOCUMENTS

2007/0190369 A1* 8/2007 Leach ....................... H02J 7/34
429/61
2014/0266061 A1* 9/2014 Wachal ............... H02J 7/00036
320/134
(Continued)

FOREIGN PATENT DOCUMENTS

| CN | 1449084 A | 10/2003 |
|---|---|---|
| CN | 201663458 U | 12/2010 |

(Continued)

OTHER PUBLICATIONS

English Translation of the International Search Report and Written Opinion for PCT Application No. PCT/CN2019/080883, dated Jun. 24, 2019 ( 5 pages).
(Continued)

*Primary Examiner* — Nathaniel R Pelton
(74) *Attorney, Agent, or Firm* — Eversheds Sutherland (US) LLP

(57) ABSTRACT

A battery management device and a mobile terminal are disclosed. The battery management device includes: a charging unit; a battery unit including at least two batteries; a power supply management circuit; and an isolation unit configured to communicate one or more of the batteries with the power supply management circuit and block the backward flow of current between batteries. The charging unit, the battery unit, the isolation unit and the power supply management circuit are successively connected.

15 Claims, 4 Drawing Sheets

(52) U.S. Cl.
CPC ........ *H02J 7/0029* (2013.01); *H02J 7/00032* (2020.01); *H01M 2010/4271* (2013.01); *H01M 2010/4278* (2013.01); *H01M 2220/30* (2013.01)

(58) Field of Classification Search
CPC . H01M 2010/4271; H01M 2010/4278; H01M 2220/20
USPC .......................................................... 320/137
See application file for complete search history.

(56) References Cited

U.S. PATENT DOCUMENTS

| | | | | |
|---|---|---|---|---|
| 2015/0056475 | A1* | 2/2015 | Adrian ................ | H01M 10/441 429/50 |
| 2017/0210312 | A1 | 7/2017 | Wandres et al. | |
| 2018/0019602 | A1* | 1/2018 | Hasan .................... | H02J 7/0029 |
| 2019/0229543 | A1* | 7/2019 | Kristjansson ....... | H02J 7/00308 |

FOREIGN PATENT DOCUMENTS

| | | | |
|---|---|---|---|
| CN | 104917245 | A | 9/2015 |
| CN | 206077010 | * | 4/2017 |
| CN | 206077010 | U | 4/2017 |
| CN | 106712174 | A | 5/2017 |
| CN | 206452153 | | 8/2017 |
| CN | 107891760 | A | 4/2018 |
| EP | 3273560 | A1 | 1/2018 |
| WO | 2012017697 | A | 2/2012 |

OTHER PUBLICATIONS

English Translation of the First Office Action of Application No. 2018103562969 dated Aug. 3, 2020 (8 pages).
European Search Report for EP Application No. 19789075.9 dated Nov. 11, 2021, 6 pages.
Supplementary European Search Report for EP Application No. 19789075.9 dated Mar. 23, 2021, 13 pages.
European Office Action for EP Application No. 19789075.9, dated Aug. 10, 2022, 4 pages.

* cited by examiner

BATTERY MANAGEMENT DEVICE AND MOBILE TERMINAL

CROSS-REFERENCE TO RELATED APPLICATIONS

This application is a national stage filing under 35 U.S.C § 371 of international application number PCT/CN2019/080883, filed Apr. 1, 2019, which claims priority to Chinese patent application No. 201810356296.9 filed Apr. 19, 2018. The content of these applications are incorporated herein by reference in their entirety.

TECHNICAL FIELD

The present application relates to, but not limited to, the field of battery management, and in particular to a battery management device and a mobile terminal.

BACKGROUND

With the continuous evolution and development of functions and performances of mobile terminals such as smart phones, the total power consumption of the mobile terminals is increasing. To improve the battery life of mobile terminals, the capacity and volume of batteries in such products are also increasing. However, the safety risk of a single battery cell with too large capacity and volume is also increasing. In recent years, there have been many mobile phone fire accidents at home and abroad. Particularly, mobile phones of a big foreign brand have caught fire several times. These fires are all finally determined to be caused by deficiencies in the large-capacity batteries. To properly avoid safety risks, two batteries or even more batteries have become a feasible solution.

At present, some mobile terminals such as mobile phones in the market have been designed with two batteries (cells). For example, in 6020 mAh batteries for mobile phones of a domestic brand, a design scheme of packaging two cells into one battery module is adopted. For a well-known foreign mobile phone brand, a design scheme of connecting a large-capacity battery and a small-capacity battery in series to supply power is used in one of the latest models of this brand. So, it seems that two batteries or even more batteries have gradually become a technical trend to increase the battery capacity while ensuring safety. Since the power supply voltage required by most of circuits in mobile terminals is very low, connecting multiple batteries in parallel to the power supply systems of the mobile terminals should be a main direction for the development of future multi-battery schemes.

However, when multiple batteries are connected in parallel to a power supply system of a mobile terminal, if the batteries are different in voltage, the batters cannot be directly connected in parallel. Otherwise, the difference in voltage between the batteries will result in the backward flow of current from a high-voltage battery to a low-voltage battery, which may result in serious safety hazards.

SUMMARY

The embodiments of the present application provide a battery management device and a mobile terminal.

The embodiments of the present application provide a battery management device, including a charging unit, a battery unit, a power supply management circuit and an isolation unit, wherein, the charging unit, the battery unit, the isolation unit and the power supply management circuit are successively connected; the battery unit includes at least two batteries; and, the isolation unit is configured to communicate one or more of the batteries with the power supply management circuit and block the backward flow of current between batteries.

The embodiments of the present application provide a mobile terminal having the above battery management device.

The embodiments of the present application provide a battery management device, including a charging unit, a battery unit, a power supply management circuit and an isolation unit, wherein the charging unit, the battery unit, the isolation unit and the power supply management circuit are successively connected; the battery unit includes at least two batteries; and, the isolation unit is configured to communicate one or more of the batteries with the power supply management circuit and block the backward flow of current between batteries. In the embodiments of the present application, the backward flow of current from a high-voltage battery to a low-voltage battery is avoided by the isolation unit, and one or more batteries can be made to supply power to the mobile terminal.

Additional features and advantages of the present application will be set forth in the description which follows, and in part will be obvious from the description, or may be learned by the practice of the present application. The objectives and other advantages of the present application will be realized and attained by the structure particularly pointed out in the written description and claims hereof as well as the appended drawings.

BRIEF DESCRIPTION OF DRAWINGS

The accompanying drawings are included to provide a further understanding of the present application and are incorporated in and constitute a part of this specification, illustrate embodiments of the present application and together with the example serve to explain the principles of this application and are not intended to limit the present application.

DETAILED DESCRIPTION

To make the objects, technical solutions and advantages of the present application more apparent, embodiments of the present application will be described in detail below with reference to the accompanying drawings. It should be noted that the embodiments and the features thereof in the present application may be arbitrarily combined with each other without conflict.

Most of multi-battery management circuits currently used in mobile terminals are composed of a digital load switch as well as a peripheral voltage detection circuit, a precise voltage reference source, a comparator and a logical control circuit connected to pins of a general purpose input/output (GPIO) of an internal processor chip in the mobile terminal. Such schemes have the disadvantages of complex circuit, low expandability and long switching time. In addition, it is very difficult to safely and smoothly switch between batteries under the premise of ensuring uninterrupted power supply, and it is difficult to simultaneously eliminate the instantaneous voltage drop and the backward flow of current between batteries. Moreover, only one battery can be connected one time, so when a relatively large current is required by each functional circuit system in the mobile terminal, a small-capacity battery fails to supply power to the mobile terminal due to insufficient maximum output current.

The battery management device provided in the embodiments of the present application can isolate multiple batteries in a case where multiple batteries are connected in parallel to supply power to a mobile terminal. Under the premise of ensuring that the batteries can normally supply power to the mobile terminal, the backward flow of current from high-voltage batteries to low-voltage batteries in the case of unequal voltage between batteries resulted from various reasons is isolated. Meanwhile, a battery that is discharged off earlier (the voltage is already very low) can be automatically isolated from other batteries, without affecting the continuous operation of the mobile terminal.

Figure 1:
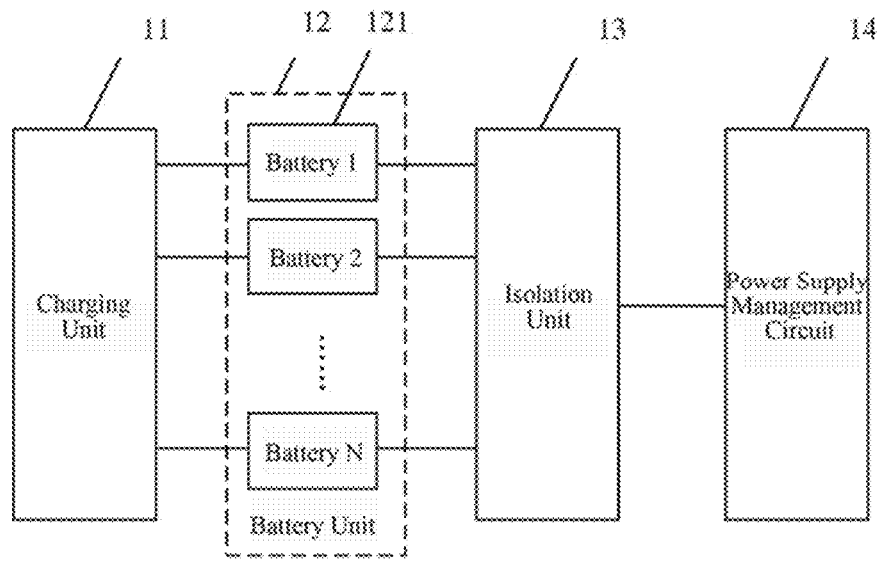
FIG. 1 is a schematic diagram of a battery management device according to an embodiment of the present application.

As shown in FIG. 1, the battery management device provided in the embodiments of the present application includes: a charging unit 11, a battery unit 12, an isolation unit 13 and a power supply management circuit 14, which all are successively connected. The battery unit 12 includes at least two batteries 121. The isolation unit 13 is configured to communicate one or more of the batteries 121 with the power supply management circuit 14 and block the backward flow of current between batteries 121.

In the embodiments of the present application, the backward flow of current from a high-voltage battery to a low-voltage battery is avoided by the isolation unit, and one or more batteries can be made to supply power to the mobile terminal. Accordingly, the maximum battery capacity allowed by the mobile terminal is increased without increasing the safety risk, and the battery life can be prolonged. In addition, due to simple circuits, the utilization of the internal space is improved, and if necessary a part of the battery space can be freed up for functional modules such as an antenna, thereby improving the performance of the mobile terminal.

The embodiments of the present application may be applied to consumer portable mobile terminal products (such as mobile phones, tablet computers or portable PCs) in which more than one battery needs to be connected in parallel due to large battery capacity or limited structural space.

Each unit will be described below.

The charging unit 11 charges the batteries 121 using processed power introduced from an external power supply interface of the mobile terminal, and may also monitor function and performance parameters of the batteries 121 such as temperature, battery remaining capacity, charging current, discharging current and internal impedance.

In other embodiments, the charging unit 11 may cooperate with a corresponding software module to provide a user with report or information display of contents related to battery state and performance.

The battery unit 12 includes at least two batteries 121. The batteries 121 are used as energy storage elements to supply power to a mobile terminal such as a mobile phone when the mobile terminal is disconnected from an external power supply system, so that the mobile terminal continuously provides the user with various functions and services in a mobile scenario without external power.

The isolation unit 13 is a unit proposed in the embodiments of the present application. The isolation unit reliably and effectively blocks the backward flow of current between batteries while ensuring continuous and reliable power supply to the circuits in the mobile terminal. That is, a battery that is discharged off or has too low a voltage due to internal failure or other reasons is isolated from other batteries, to avoid affecting the power supply to the mobile terminal. This unit may be implemented by electronic components with unilateral conductivity such as diodes, or may be implemented by various circuits or software in combination with corresponding switch components.

The power supply management circuit 14 generally includes a multi-way switching power supply, a linear power supply and matched control circuits, and is configured to convert an external input power supply or a power supply provided by the batteries into different voltages required by various functional circuits in the mobile terminal.

The isolation unit 13 will be described below in detail.

Figure 2:
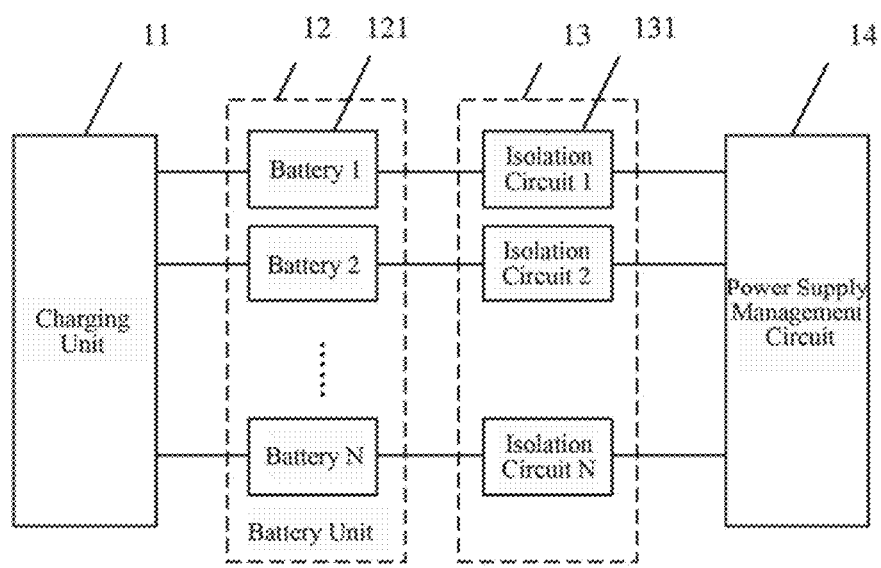
FIG. 2 is a schematic diagram of a battery management device according to another embodiment of the present application.

As shown in FIG. 2, in an embodiment, the isolation unit 13 can communicate one or more batteries 12 with the highest voltage with the power supply management circuit 14. The isolation unit 13 includes at least two isolation circuits 131 which are in a one-to-one correspondence to the batteries 121. That is, the number of the isolation circuits 131 is equal to that of the batteries. The isolation circuits 131 are connected in series between the corresponding batteries 121 and the power supply management circuit 14. When a voltage at ends of the isolation circuits 131 connected to the batteries is greater than a specified threshold for a voltage at ends of the isolation circuits 131 connected to the power supply management circuit, the isolation circuits 131 are turned on; and, when the voltage at the ends of the isolation circuits 131 connected to the batteries is less than the specified threshold for the voltage at the ends of the isolation circuits connected to the power supply management circuit, the isolation circuits 131 are turned off.

The isolation circuits 131 may be implemented by various circuits or chips. For example, the isolation circuits may be implemented by electronic components with unilateral conductivity such as diodes, or may be implemented by various circuits or software in combination with corresponding switch components.

In an embodiment of the present application, each of the isolation circuits 131 is an ideal diode circuit, with an anode of the ideal diode circuit being connected to a cathode of a corresponding battery and a cathode of the ideal diode circuit being connected to the power supply management circuit.

In the embodiments of the present application, the unilateral conductivity of the diode may be used to realize isolation of the backward flow of current between batteries connected to the system at the same time. The unidirectional conductivity of the diode can not only block the backward flow of current flowing into the batteries, but also allow the current supplied to the mobile terminal by the batteries to pass through normally. However, parameters (such as forward voltage drop, reverse leakage current and heat dissipation power) of actual components (such as semiconductor power diodes) are difficult to meet the strict requirements of mobile terminals (for example, the backward voltage drop is required to be within tens of millivolts, the reverse leakage current is required to be within tens of microamperes, and the heat dissipation power is required to be within tens of milliwatts).

The ideal diode is an ideal circuit element model, characterized in that the current can be transmitted in only one direction. When the voltage at the anode is higher than that at the cathode, the element is turned on and the current flows in a direction from the anode to the cathode. Otherwise, the element is turned off, and the current does not flow.

In the embodiments of the present application, the ideal diode circuit may be implemented by a dedicated ideal diode circuit chip, or may be implemented by an ideal diode control module in combination with a metal-oxide-semiconductor field-effect transistor (MOSFET), wherein the ideal diode control module may be a dedicated control chip or may be implemented by a discrete amplifier circuit. The MOSFET can reach a level of a few milliohms due to its very low turn-on resistance, so that the forward turn-on voltage drop of the simulated ideal diode is much smaller than that of the semiconductor power diode.

Figure 3:
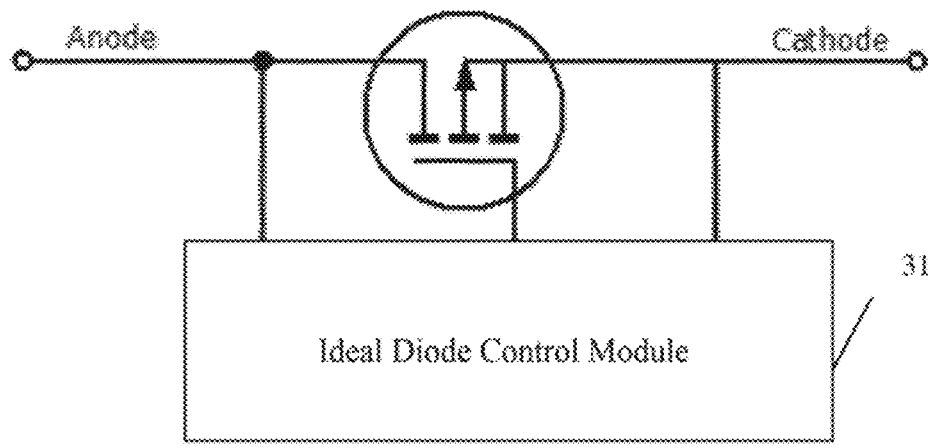
FIG. 3 is a schematic diagram of an ideal diode circuit according to an embodiment of the present application.

As shown in FIG. 3, in the embodiments of the present application, the ideal diode circuit may include an MOSFET and an ideal diode control module 31. An output end of the ideal diode control module 31 is connected to a grid of the MOSFET, while two input ends of the ideal diode control module 31 are connected to a cathode of a corresponding battery and the power supply management circuit, respectively. Two ends of the ideal diode circuit are connected to a drain and a source of the MOSFET, respectively. The ideal diode control module 31 controls the turn-on or turn-off of the MOSFET according to a difference in voltage between the two input ends.

Figure 4:
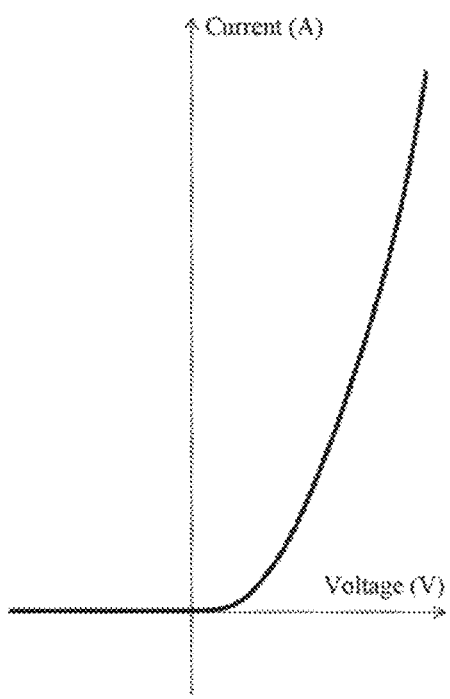
FIG. 4 is a transmission characteristic diagram of an ideal diode circuit according to an embodiment of the present application.

FIG. 4 shows a transmission characteristic diagram of the ideal diode circuit according to the embodiments of the present application. The reverse leakage current of the simulated ideal diode is in a microampere level and is almost zero, and the forward voltage drop is generally within 30 millivolts, which is much smaller than that of the semiconductor diode under the same current. Accordingly, the negative effects caused by the reverse leakage current and the forward voltage drop that increases with the current rise of existing actual semiconductor diode components are avoided. In addition, when the batteries are different in voltage, only batteries with the highest voltage will be connected to the power supply management circuit, and batteries with a lower voltage will be isolated due to the unilateral conductivity of the diode, without affecting other batteries with a higher voltage. When the batteries are identical in voltage, the batteries supply power to the power supply management circuit simultaneously. The current output by each battery depends upon the internal discharging characteristics such as internal resistance of this battery, and is distributed in a certain proportion. Thus, the connection of each battery to the power supply system can be completely determined by the hardware circuit automatically, and the current load can be equally distributed between batteries automatically, without any software intervention.

Figure 5:
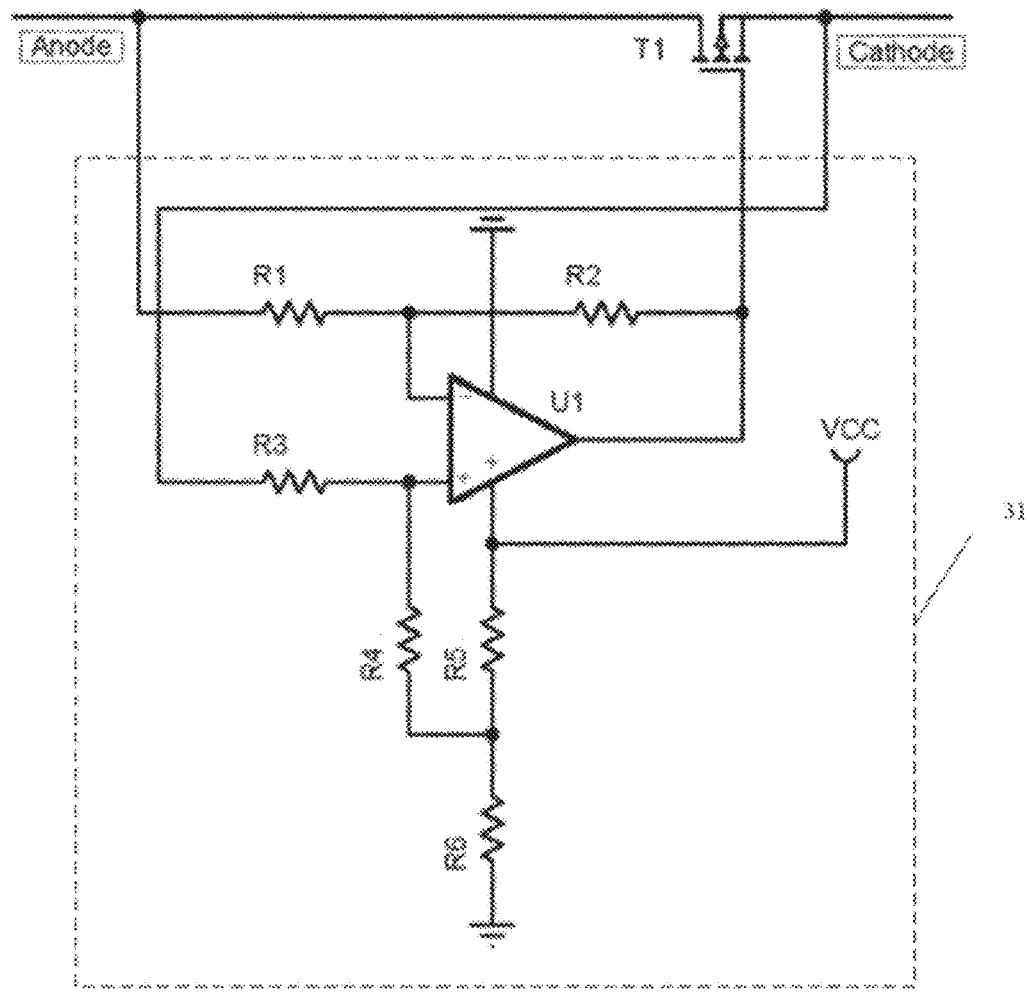
FIG. 5 is a schematic diagram of using a differential-input inverting amplifier as an ideal diode control module according to an embodiment of the present application.

FIG. 5 shows an embodiment of using a differential-input inverting amplifier as the ideal diode control module 31 in the ideal diode circuit, where Anode denotes the anode of the ideal diode and Cathode denotes the cathode of the ideal diode. This ideal diode circuit simulates an ideal diode in terms of circuit characteristics. When the voltage at the anode is higher than that at the cathode, the circuit is turned on; or otherwise, the circuit is turned off. In this example, the MOSFET T1 is a P-channel enhancement MOSFET, with a drain of the MOSFET T1 being the anode of the ideal diode circuit and a source of the MOSFET T1 being the cathode of the ideal diode circuit. The differential-input inverting amplifier includes an operational amplifier U1 and six resistors R1-R6. One end of the resistor R1 is connected to the drain of the MOSFET T1, while the other end of the resistor R1 is connected to a negative power supply of the operational amplifier U1 and the resistor R2. One end of the resistor R2 is connected to the negative power supply of the operational amplifier U1 and the resistor R1, while the other end of the resistor R2 is connected to an output of the operational amplifier U1 and a grid of the MOSFET T1. One end of the resistor R3 is connected to the source of the MOSFET T1, while the other end of the resistor R3 is connected to a positive power supply of the operational amplifier U1 and the resistor R4. One end of the resistor R4 is connected to the positive power supply of the operational amplifier U1 and the resistor R3, while the other end of the resistor R4 is connected between the resistors R5 and R6. One end of the resistor R5 is connected to the power supply VCC, while the other end of the resistor R5 is connected to the resistors R4 and R6. One end of the resistor R6 is connected to the resistors R4 and R6, while the other end of the resistor R6 is grounded. The negative power supply of the operational amplifier U1 is connected between the resistors R1 and R2, the positive power supply of the operational amplifier U1 is connected between the resistors R3 and R4, and the output of the operational amplifier U1 is connected to the resistor R2 and the grid of the MOSFET T1. An input signal of the differential-input inverting amplifier is the difference in voltage between two ends of the MOSFET, and an output signal from the differential-input inverting amplifier is used to drive the P-channel MOSFET T1.

When the voltage on a left side of the MOSFET T1 is higher than that on a right side of the MOSFET T1, an output voltage of the amplifier is close to 0 V, and the P-channel MOSFET T1 is turned on; or otherwise, the output voltage of the amplifier is close to the power supply voltage, and the P-channel MOSFET T1 is turned off. The behavior characteristics of the circuit are very close to those of the ideal diode.

In addition to the realization of the circuit by using the ideal diode composed of discrete elements, it is possible to use a dedicated ideal diode control chip or a dedicated ideal diode circuit chip to realize the functions of the ideal diode. In combination with a dedicated ideal diode control chip externally connected to an MOSFET or a dedicated ideal diode circuit chip with a built-in MOSFET, the realized ideal diode circuit has the advantages of insensitivity to the discreteness of parameters for the components forming the circuit, high consistency of parameters for the finished circuit, high first pass yield during mass production, easy maintenance and the like.

It is to be noted that, the ideal diode circuit may be in various forms, and the ideal diode circuit in the present application includes but is not limited to the above scheme.

Figure 6:
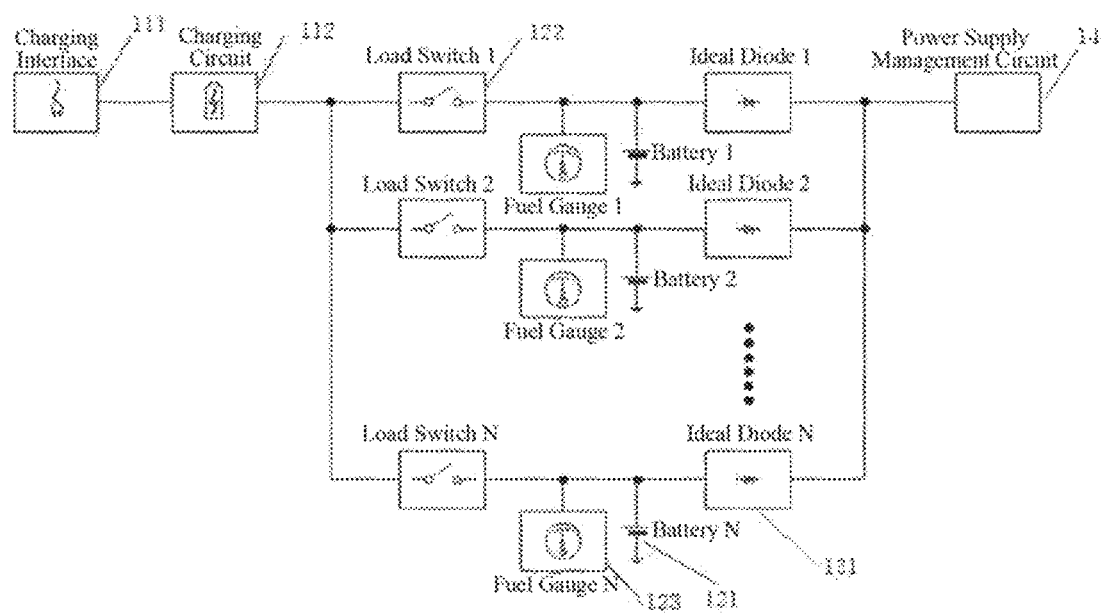
FIG. 6 is a schematic diagram of a first charging mode according to an application example of the present application.
Figure 7:
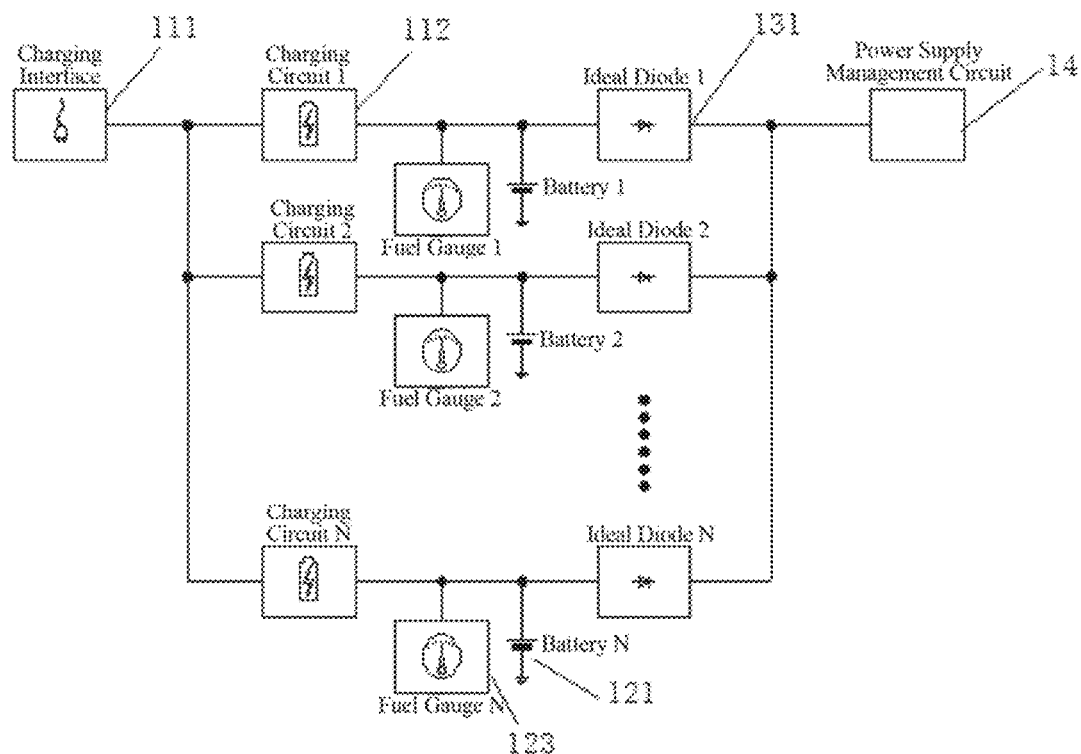
FIG. 7 is a schematic diagram of a second charging mode according to an application example of the present application.
Figure 8:
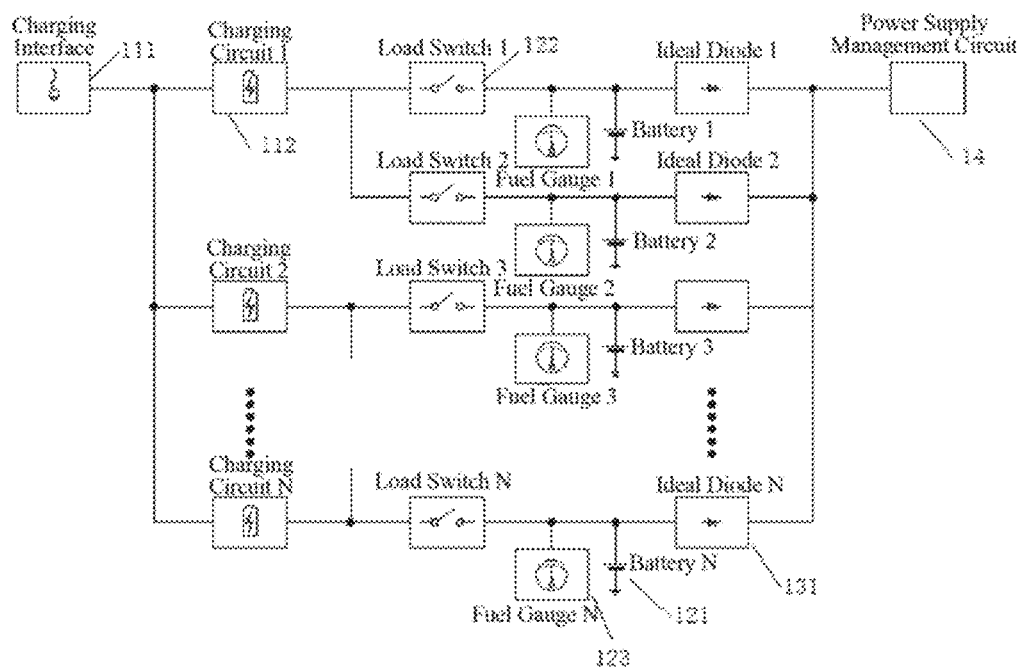
FIG. 8 is a schematic diagram of a third charging mode according to an application example of the present application.

As shown in FIGS. 6-8, the isolation unit 13 implemented by ideal diode circuits is connected in series between each battery and the power supply management circuit 14. Since the diode blocks the current flowing into the batteries, the path between the charging unit 11 and the batteries 121 does not pass through the ideal diode and is directly connected to the batteries.

The charging unit 11 may include a charging interface and one or more charging circuits. There are many charging schemes for the multi-battery mobile terminal. For example, the following modes may be used.

Mode 1: All batteries share one charging circuit, and the charging circuit is switched by load switches to charge corresponding batteries.

As shown in FIG. 6, the charging unit 11 includes a charging interface 111 and a charging circuit 112 which are connected to each other. The battery unit 12 further includes at least two load switches 122 which are in a one-to-one correspondence to the batteries 121. One end of each of the load switches 122 is connected to the charging circuit 112, while the other end of each of the load switches 122 is connected to the cathode of the corresponding battery 121.

In this mode, only one charging circuit 112 is used, and one or more specified batteries 121 are charged by controlling the on/off state of the load switches 122.

Mode 2: one corresponding charging circuit is configured for each battery.

As shown in FIG. 7, the charging unit 11 includes a charging interface 111 and at least two charging circuits 112 which are in a one-to-one correspondence to the batteries 121. One end of each of the charging circuits 112 is connected to the charging interface 111, while the other end of each of the charging circuits 112 is connected to the cathode of the corresponding battery 121.

In this mode, multiple charging circuits 112 are used, each charging circuit 112 corresponds to one battery 112, and the load switches in Mode 1 are not required. However, the number of the charging circuits 112 is increased.

Mode 3: It is a combination of Mode 1 and Mode 2. The batteries are divided into several groups, one charging circuit is configured for each group of batteries, and the batteries in each group are switched by load switches.

As shown in FIG. 8, the battery unit 12 includes at least two battery groups. Each of the battery groups includes one or more batteries 121 and load switches 122 which are in a one-to-one correspondence to the batteries 121. The charging unit 11 includes a charging interface 111 and at least two charging circuits 112 which are in a one-to-one correspondence to the battery groups. One end of each of the charging circuits 112 is connected to the charging interface 111, while the other end of each of the charging circuits 112 is connected to the corresponding battery group. One end of each of the load switches 122 is connected to the corresponding charging circuit 112, while the other end of the load switches 122 is connected to the cathode of the corresponding battery 121.

In this mode, by using battery groups, compared with Mode 2, the number of the charging circuits 112 is decreased, and the number of load switches 122 is increased.

In addition, as shown in FIGS. 6-8, the battery unit 12 further includes at least two fuel gauges, which are in a one-to-one correspondence to the batteries 121 and are used to collect the battery level of the corresponding battery 121.

An embodiment of the present application further provides a mobile terminal, including the battery management device described above.

The mobile terminal may be implemented in various forms. For example, the mobile terminal described in the embodiments of the present application may be a mobile phone, a smart phone, a notebook computer, a digital broadcast receiver, a PDA (Personal Digital Assistant), a PAD (Tablet Computer), a PMP (Portable Media Player), a navigation device, and the like. However, those skilled in the art will appreciate that the configuration according to the embodiment of the present application can be applied to a fixed type terminal (e.g., a fixed terminal, such as a digital TV, a desktop computer, etc.), in addition to elements particularly used for mobile purposes.

Although the embodiments of the present application have been described above, the above description is only for the purpose of understanding the present application, and is not intended to limit the present application. It will be understood by those skilled in the art that various changes in form and details may be made therein without departing from the scope of the application as defined by the appended application.

The invention claimed is:

1. A battery management device, comprising:
   a charging unit;
   a battery unit comprising at least two batteries;
   a power supply management circuit; and
   an isolation unit configured to communicate one or more of the at least two batteries with the power supply management circuit and block the backward flow of current between the at least two batteries,
   wherein, the charging unit, the battery unit, the isolation unit and the power supply management circuit are successively connected;
   wherein the isolation unit is configured to communicate a battery having the highest voltage with the power supply management circuit; the isolation unit comprises at least two isolation circuits which are in a one-to-one correspondence to the at least two batteries;
   wherein each of the isolation circuits is an ideal diode circuit, with an anode of the ideal diode circuit being connected to a cathode of a corresponding battery and a cathode of the ideal diode circuit being connected to the power supply management circuit;
   the ideal diode circuit comprises a metal-oxide-semiconductor field-effect transistor (MOSFET) and an ideal diode control module;
   wherein an output end of the ideal diode control module is connected to a grid of the MOSFET, while two input ends of the ideal diode control module are connected to the cathode of the corresponding battery and the power supply management circuit, respectively; two ends of the ideal diode circuit are connected to a drain and a source of the MOSFET, respectively; and,
   wherein the ideal diode control module controls the turn-on or turn-off of the MOSFET according to a difference in voltage between the two input ends.

2. The device according to claim 1,
   wherein the isolation circuits are connected in series between the corresponding at least two batteries and the power supply management circuit;
   when a voltage at ends of the isolation circuits connected to the at least two batteries is greater than a specified threshold for a voltage at ends of the isolation circuits connected to the power supply management circuit, the isolation circuits are turned on; and,
   when the voltage at the ends of the isolation circuits connected to the at least two batteries is less than the specified threshold for the voltage at the ends of the isolation circuits connected to the power supply management circuit, the isolation circuits ae turned off.

3. The device according to claim 1, wherein the ideal diode control module is a differential-input inverting amplifier or an ideal diode control chip.

4. The device according to claim 1, wherein the MOSFET is a P-channel enhancement MOSFET, with the drain of the MOSFET being the anode of the ideal diode circuit while the source of the MOSFET being the cathode of the ideal diode circuit.

5. The device according to claim 1,
wherein the charging unit comprises a charging interface and a charging circuit which are connected to each other; and,
wherein the battery unit further comprises at least two load switches which are in a one-to-one correspondence to the at least two batteries, with one end of each of the load switches being connected to the charging circuit while the other end of each of the load switches being connected to the cathode of the corresponding battery.

6. The device according to claim 1, wherein the charging unit comprises a charging interface and at least two charging circuits which are in a one-to-one correspondence to the at least two batteries, with one end of each of the charging circuits being connected to the charging interface while the other end of each of the charging circuits being connected to the cathode of the corresponding battery.

7. The device according to claim 1,
wherein the battery unit comprises at least two battery groups; each of the battery groups comprises one or more of the at least two batteries and load switches which are in a one-to-one correspondence to the at least two batteries;
wherein the charging unit comprises a charging interface and at least two charging circuits which an in a one-to-one correspondence to the battery groups, with one end of each of the charging circuits being connected to the charging interface while the other end of each of the charging circuits being connected to the corresponding battery group; and,
wherein one end of each of the load switches is connected to the corresponding charging circuit, while the other end of each of the load switches is connected to the cathode of the corresponding battery.

8. A mobile terminal, comprising the battery management device according to claim 1.

9. The device according to claim 3, wherein the MOSFET is a P-channel enhancement MOSFET, with the drain of the MOSFET being the anode of the ideal diode circuit while the source of the MOSFET being the cathode of the ideal diode circuit.

10. The device according to claim 2,
wherein the charging unit comprises a charging interface and a charging circuit which are connected to each other; and,
wherein the battery unit further comprises at least two load switches which are in a one-to-one correspondence to the at least two batteries, with one end of each of the load switches being connected to the charging circuit while the other end of each of the load switches being connected to the cathode of the corresponding battery.

11. The device according to claim 2, wherein the charging unit comprises a charging interface and at least two charging circuits which are in a one-to-one correspondence to the at least two batteries, with one end of each of the charging circuits being connected to the charging interface while the other end of each of the charging circuits being connected to the cathode of the corresponding battery.

12. The device according to claim 2,
wherein the battery unit comprises at least two battery groups; each of the battery groups comprises one or more of the at least two batteries and load switches which are in a one-to-one correspondence to the at least two batteries;
wherein the charging unit comprises a charging interface and at least two charging circuits which an in a one-to-one correspondence to the battery groups, with one end of each of the charging circuits being connected to the charging interface while the other end of each of the charging circuits being connected to the corresponding battery group; and,
wherein one end of each of the load switches is connected to the corresponding charging circuit, while the other end of each of the load switches is connected to the cathode of the corresponding battery.

13. A mobile terminal according to claim 8,
wherein the isolation unit is configured to communicate one or more of the at least two batteries having the highest voltage with the power supply management circuit; the isolation unit comprises at least two isolation circuits which ae in a one-to-one correspondence to the at least two batteries;
wherein the isolation circuits are connected in series between the corresponding batteries and the power supply management circuit;
when a voltage at ends of the isolation circuits connected to the at least two batteries is greater than a specified threshold for a voltage at ends of the isolation circuits connected to the power supply management circuit, the isolation circuits ae turned on; and,
when the voltage at the ends of the isolation circuits connected to the at least two batteries is less than the specified threshold for the voltage at the ends of the isolation circuits connected to the power supply management circuit, the isolation circuits ae turned off.

14. A mobile terminal according to claim 8,
wherein the charging unit comprises a charging interface and a charging circuit which ae connected to each other, and,
wherein the battery unit further comprises at least two load switches which are in a one-to-one correspondence to the at least two batteries, with one end of each of the load switches being connected to the charging circuit while the other end of each of the load switches being connected to the cathode of the corresponding battery.

15. A mobile terminal according to claim 8,
wherein the charging unit comprises a charging interface and at least two charging circuits which are in a one-to-one correspondence to the at least two batteries, with one end of each of the charging circuits being connected to the charging interface while the other end of each of the charging circuits being connected to the cathode of the corresponding battery.

* * * * *